United States Patent
Thoguluva et al.

(10) Patent No.: US 9,712,274 B2
(45) Date of Patent: Jul. 18, 2017

(54) OPTICAL COMMUNICATION SYSTEM WITH A HIERARCHICAL BRANCH CONFIGURATION

(71) Applicant: Tyco Electronics Subsea Communications LLC, Eatontown, NJ (US)

(72) Inventors: Janar Thoguluva, North Brunswick, NJ (US); Edwin Muth, Aberdeen, NJ (US); Adnan Akhtar, Howell, NJ (US)

(73) Assignee: TYCO ELECTRONICS SUBSEA COMMUNICATIONS LLC, Eatontown, NJ (US)

( * ) Notice: Subject to any disclaimer, the term of this patent is extended or adjusted under 35 U.S.C. 154(b) by 138 days.

(21) Appl. No.: 14/837,751

(22) Filed: Aug. 27, 2015

(65) Prior Publication Data

US 2016/0248536 A1   Aug. 25, 2016

Related U.S. Application Data

(63) Continuation-in-part of application No. 14/631,815, filed on Feb. 25, 2015.

(51) Int. Cl.
*H04J 14/02* (2006.01)
*H04B 10/278* (2013.01)

(52) U.S. Cl.
CPC ........ *H04J 14/0282* (2013.01); *H04B 10/278* (2013.01); *H04J 14/0204* (2013.01); *H04J 14/0286* (2013.01)

(58) Field of Classification Search
None
See application file for complete search history.

(56) References Cited

U.S. PATENT DOCUMENTS

| | | |
|---|---|---|
| 6,204,943 B1 | 3/2001 | Hamel et al. |
| 2002/0063921 A1 | 5/2002 | Terahara et al. |
| 2010/0008666 A1 | 1/2010 | Kovsh et al. |
| 2011/0064409 A1 | 3/2011 | Grobe |
| 2012/0213517 A1 | 8/2012 | Ji et al. |
| 2012/0263476 A1 | 10/2012 | Sabet et al. |
| 2013/0330086 A1 | 12/2013 | Berlin et al. |

FOREIGN PATENT DOCUMENTS

WO   00/76105   12/2000

OTHER PUBLICATIONS

European Search Report dated Aug. 5, 2016 received in corresponding European Patent Application No. 16157094.0.
U.S. Office Action in related U.S. Appl. No. 14/631,815 mailed Mar. 20, 2017.

*Primary Examiner* — Jerry Rahll

(57) ABSTRACT

An optical communication system with a hierarchical branch configuration. The system includes first and second cable landing stations coupled to a trunk path in an optical cable. At least one hub-node is coupled to the trunk path through an associated hub-node branching unit. In an embodiment, mid-nodes are coupled the hub-nodes through associated mid-node branching units and mid-node paths in the optical cable. Mid-node signals may be communicated between the mid-nodes and the hub-nodes without being provided on the trunk path. Sub-nodes are coupled to at least one of the mid-nodes through associated sub-node branching units and sub-node paths in the optical cable. Sub-node signals may also be communicated between the sub-nodes and the mid-nodes without being provided on the trunk path or the mid-node path.

20 Claims, 8 Drawing Sheets

OPTICAL COMMUNICATION SYSTEM WITH A HIERARCHICAL BRANCH CONFIGURATION

CROSS-REFERENCE TO RELATED APPLICATIONS

The present application is a continuation-in-part of U.S. patent application Ser. No. 14/631,815, titled "Optical Communication System With A Hierarchical Branch Configuration," filed on Feb. 25, 2015, the entire disclosure of which is incorporated herein by reference.

TECHNICAL FIELD

The present disclosure relates to optical communication systems and in particular, to an optical communication system with a hierarchical branch configuration.

BACKGROUND

In optical communication systems a single optical fiber may be used to carry multiple optical signals. Each of the optical signals may be modulated on a separate associated wavelength referred to as a channel. The optical signals may be multiplexed to form a wavelength division multiplexed (WDM) signal that is transmitted on the optical fiber. WDM systems may have a high traffic capacity. For example, a WDM system may carry 100 channels or more at 10 to 100 gigabits per second (hereinafter Gb/s) or higher.

WDM optical communication systems may be provided in a trunk and branch configuration including a trunk path extending between trunk terminals and branch paths coupled to the trunk path by associated branching units and extending between the trunk path and associated branch terminals. The system may be configured to provide independence between the branch terminals while maximizing transmission capacity on the trunk and branch paths.

Some trunk and branch optical communication systems do not require maximum capacity on the trunk and branch paths. For example, some optical communication systems may include a large number, e.g. sixty-four or more, of branch paths connecting two shore landing stations to associated oil platforms and other offshore resources (referred to herein as nodes) and may thus place a high value on the number of supported connections.

The reliability of connectivity from each node to the shore may be critical in such applications and may be achieved by sending a wavelength from each node in an "east" direction toward one shore station, while the same data is replicated on a wavelength going "west" to the other shore station. The terms "east" and "west" are used herein to describe opposite directions of transmission in an optical cable and not necessarily to describe compass direction.

One challenge in these systems may be the overall loss on the trunk path resulting from a large number of nodes and associated branching units. Each branching unit (BU) coupled to the trunk path for supporting a branch path and an associated node contributes loss, e.g. 3 dB or higher, to the overall loss on the trunk path. The loss may require compensation by addition of optical amplifiers to the trunk path. Each optical amplifier may compensate for the loss associated with only a few of the nodes coupled to the trunk path.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
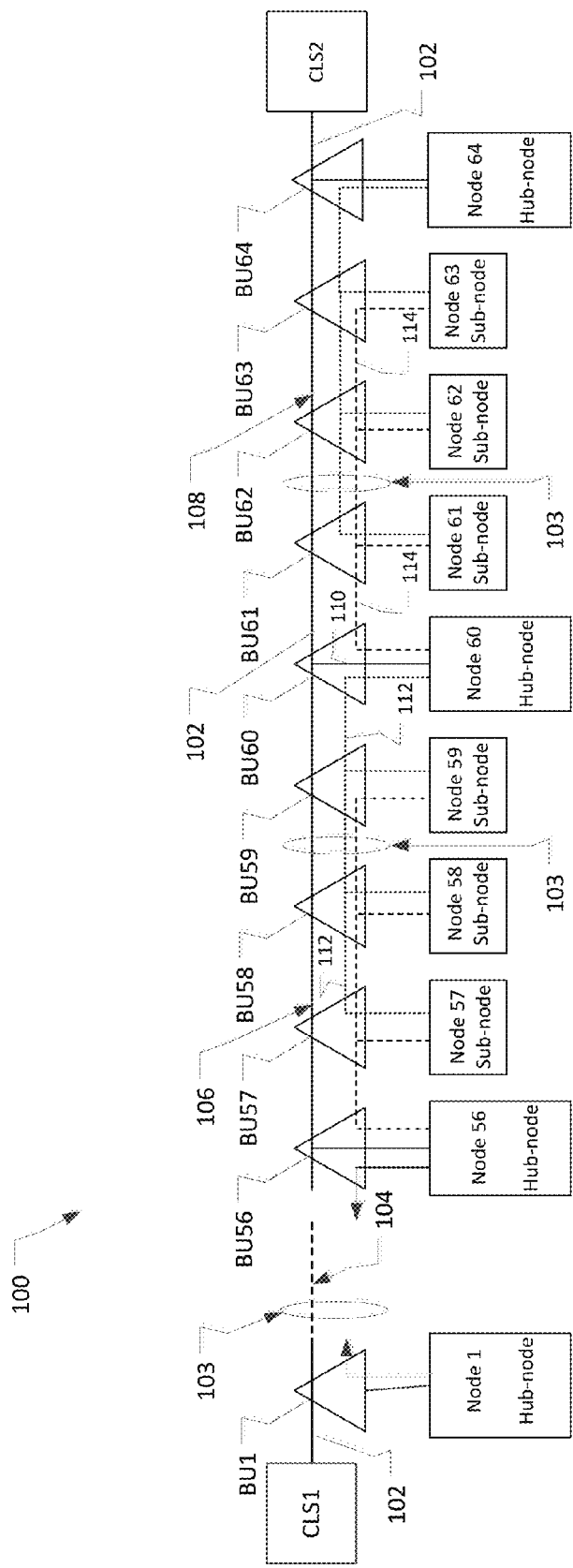
FIG. 1 is a schematic illustration of an optical communication system having a two-level configuration consistent with the present disclosure.

In general, the present disclosure provides an optical communication system with a hierarchical branch configuration allowing communication between nodes without necessarily providing a dedicated wavelength, or channel, on a trunk path for each node communicatively coupled to the communication system. This disclosure manifests an appreciation that known systems include a separate branching unit coupled to the trunk path for each node, and a separate wavelength associated with each node. Some aspects and embodiments of the present disclosure allows for a reduction in the number of wavelengths required for connectivity of all the nodes in the optical communication system because only the hub-nodes have associated wavelengths on the trunk path. This advantageously reduces total loss on the trunk path due to fewer branching units coupled and operating on the trunk path. In addition, this allows for use of high-capacity transponders for communication between the cable landing stations (CLSs) and the hub-nodes, and importantly, reduces the overall number of optical amplifiers required on the trunk path to effectively communicate optical signals.

In an embodiment, a trunk path extends between two CLSs and includes a plurality of hub-nodes coupled to the trunk path through an associated branch path and branching unit. Sub-nodes are coupled to the hub-nodes through a sub-node path that does not include the trunk path. Data to/from the sub-nodes passes through the hub-nodes, and is provided to the CLSs using the same wavelength as the hub-node(s). This may be viewed as a two-level hierarchical configuration with the hub-nodes at a first level of the hierarchy, and the sub-nodes at a second level of the hierarchy. Redundant connectivity may be provided whereby each of the hub-nodes and sub-nodes communicates the same data to both of the CLSs.

Thus a two-level hierarchal configuration consistent with the present disclosure may include the trunk paths coupled to the branch paths only at each of the hub-nodes. Branching units associated with the sub-nodes couple the sub-nodes to one or more hub-nodes through a sub-node path that does not include the trunk path, thereby avoiding loss on the trunk path associated with sub-node branching units. In addition, the sub-nodes do not require a separate associated wavelength on the trunk path for communicating with the CLSs, since they communicate with the CLSs using the same wavelength used for associated hub-node(s).

In another embodiment, a trunk path extends between two CLSs and includes a plurality of hub-nodes coupled to the trunk path through an associated branch path and branching unit, similar to the two-level hierarchical configuration discussed above. However, in this embodiment mid-nodes are coupled to the hub-nodes through a mid-node path that does not include the trunk path. Data to/from the mid-nodes passes through the hub-nodes and is provided to the CLSs using the same wavelength as the hub-node(s). The mid-nodes form a mid-node path that is separate from the trunk path. However, each mid-node also couples to a plurality of associated sub-nodes, and provides a sub-node path that does not utilize either of the trunk path or the mid-node path. Thus, data to/from the sub-nodes may pass through the mid-nodes, and then through the hub-nodes, and then is ultimately provided to the CLSs using the same wavelength as the hub-node(s). This may be viewed as a three-level hierarchical configuration, with the hub-nodes at a first level of the hierarchy, the mid-nodes at a second level of the hierarchy, and the sub-nodes at a third level of the hierarchy. Redundant connectivity may be provided whereby each of the hub-nodes, mid-nodes, and sub-nodes communicate the same data to both of the CLSs.

Thus a three-level hierarchal configuration consistent with the present disclosure may include the trunk paths coupled to the branch paths only at each of the hub-nodes. Branching units associated with the mid-nodes couple the mid-nodes to one or more hub-nodes through the mid-node path, and advantageously avoids utilizing the trunk path, thereby avoiding loss on the trunk path associated with mid-node branching units. In addition, the mid-nodes do not require a separate associated wavelength on the trunk path for communicating with the CLSs. Instead, the mid-nodes communicate with the CLSs using the same wavelength as their associated hub-node(s). Branching units associated with the sub-nodes couple the sub-nodes to one or more mid-nodes through the sub-node path, which also does not utilize the trunk path, and thereby also avoids the introduction of loss on the trunk path associated with sub-node branching units.

Optical Communication System with Two-Level Hierarchy Architecture and Operation Turning now to FIG. 1, there is illustrated one example of an optical communication system 100 having a two-level configuration consistent with the present disclosure. The system 100 has been depicted in highly simplified form for ease of explanation. The optical communication system 100 includes cable landings stations CLS1 and CLS2 coupled to a trunk path 102 in an optical cable 103, a plurality of branching units BU1 . . . BU64, and a plurality of nodes, Node 1 . . . Node 64.

The optical cable 103 includes a plurality of interconnected optical cable segments, e.g. cable segments 104, 106, 108. The cable segments, e.g. cable segments 104, 106, 108, may include one or more optical fiber pairs and may be coupled to one or more optical amplifiers/repeaters. For ease of illustration, optical amplifiers/repeaters are not shown in FIG. 1.

The optical cable 103 may span a body of water. When used to span a body of water, e.g. an ocean, the branching units BU1 . . . BU64 may be seated on the ocean floor and optical cable 103 may span between cable landing stations CLS1 and CLS2 positioned at beach landings. The nodes Node 1 . . . Node 64 may be disposed on land and/or on offshore platforms, such as oil drilling platforms.

The trunk path 102 may be established by one or more optical fiber pairs within the optical cable 103, and allows for bi-directional communication between the cable landing stations CLS1, CLS2. The cable landing stations CLS1, CLS2 may include known optical equipment for sending and receiving WDM optical signals to/from the trunk path 102.

Some of the nodes, e.g. Node 1, Node 56, Node 60, Node 64 are configured as hub-nodes and other nodes, e.g. Nodes 57 . . . Node 59 and Nodes 61 . . . Node 63, are configured as sub-nodes. Although the illustrated exemplary embodiment includes sixty-four nodes Node 1 . . . Node 64 and associated branching units BU1 . . . BU64, any number of nodes and branching units may be provided in a system consistent with the present disclosure.

Each of the hub-nodes, e.g. Node 1, Node 56, Node 60, Node 64, is coupled to the trunk path 102 by an associated branch path, e.g. path 110 associated with Node 60, and an associated one of the branching units, e.g. BU60 associated with Node 60. Of the branching units BU1 . . . BU64, only the branching units, e.g. BU1, BU56, BU60, BU64, associated with hub-nodes contribute significant loss on the trunk path 102, since only the branching units associated with hub-nodes are configured to add/drop signals to/from the trunk path 102. Each of the sub-nodes, e.g. Nodes 57 . . . Node 59 and Nodes 61 . . . Node 63, are coupled to one or more of the hub-nodes through an associated branching unit, e.g. BU57 . . . BU59 and BU61 . . . BU63, respectively. The branching units, e.g. BU57 . . . BU59 and BU61 . . . BU63, associated with the sub-nodes do not add/drop signals to/from the trunk path and do not contribute significant loss on the trunk path.

In general, the branching unit, e.g. BU60, associated with each hub-node, e.g. Node 60, is configured to drop one or more aggregate signals to the associated hub-node. The hub-node is configured to receive the aggregate signals from its associated branching unit and decode the signal on a specific associated wavelength. Each hub-node is configured to decode aggregate signals on a different wavelength from the others of the hub-nodes.

The aggregate signals decoded by each hub-node include data designated for the hub-node and data designated for one or more associated sub-nodes that are coupled to the hub-node. The data designated for the hub-node may be received by the hub-node. The data from the aggregate signal and designated for the sub-nodes is modulated on wavelengths associated with the sub-nodes and transmitted by the hub-node to the sub-nodes as associated sub-node signals. The sub-node signals are transmitted from the hub-node to the sub-nodes associated therewith through the branching units associated with the hub-node and the sub-node and through an associated sub-node path, e.g. paths 112 and 114, extending from the hub-node, e.g. Node 60, through the optical cable 103 and to the sub-node. The sub-node paths, e.g. paths 112 and 114, may include one or more dedicated fiber pairs within the cable 103 on which sub-node signals are transmitted from the hub-node to the associated sub-node, and/or may include single path within the cable 103 on which sub-node signals for multiple sub-nodes are multiplexed for transmission from the hub-node to the sub-nodes.

Each sub-node path, e.g. paths 112 and 114, is within the optical cable 103, but does not include any portion of the trunk path 102. With this configuration, sub-node signals to/from the sub-nodes may be sent to/from the hub-nodes without being provided on the trunk path. This avoids trunk path loss, e.g. branching unit loss, associated with communicating sub-node signals to/from the sub-nodes.

The sub-nodes e.g. Nodes 57 ... Node 59 and Nodes 61 ... Node 63, are configured to receive sub-node signals from their associated hub-nodes and decode sub-node signals on a specific wavelength associated with the sub-node. Sub-node signals transmitted from a sub-node and destined for the cable landing stations CLS1, CLS2, are modulated on the wavelength associated with the sub-node and transmitted to the hub-nodes associated with the sub-node through the associated sub-node path.

The hub-nodes associated with the sub-nodes are configured to receive sub-node signals from the associated sub-nodes at specific wavelengths associated with the sub-nodes and decode the data on the sub-node signals. Each of the hub-nodes modulates the data from the sub-node signals along with data from the hub-node onto the wavelength associated with the hub-node and transmit an associated aggregate signal to one or more of the cable landing stations CLS1, CLS2.

For example, in the illustrated system 100, hub-nodes, Nodes 1 and Node 64, respectively, immediately adjacent the cable landing stations, CLS1, CLS2, may be configured to support communication between one or more of the cable landing stations CLS1, CLS2 and three sub-nodes immediately adjacent thereto (not shown). The remaining hub-nodes may be configured to support three sub-nodes preceding the hub-node and three sub-nodes following the hub-node. Additional fibers pairs may be provided in the optical cable 103 to establish the sub-node paths between the hub-nodes and their associated sub-nodes. For example, in the illustrated embodiment one or more additional fiber pairs may be provided in the optical cable 103 to establish a sub-node path 112 connecting Node 57 ... Node 59 to Node 60 and one or more additional fiber pairs may be provided in the optical cable 103 to establish the sub-node path 114 connecting Node 61 ... Node 63 to Node 60. Again, FIG. 1 is one example of a configuration consistent with the present disclosure. It is to be understood that a system consistent with the present disclosure may support any number and arrangement of hub-nodes and associated sub-nodes.

With continued reference to the system 100 illustrated in FIG. 1, the hub-node identified as Node 60, for example, may be configured to receive signals from the trunk path 102 through its associated branching unit, BU60 and branch path 110, and decode an aggregate signal on a specific associated wavelength. The aggregate signal decoded by the hub-node Node 60 may include data designated for the hub-node Node 60 and data designated for the sub-nodes Node 57 ... Node 59 and Node 61 ... Node 63 that are coupled to the hub-node Node 60. Data designated for the sub-nodes coupled to the hub-node is transmitted from the hub-node Node 60 as sub-node signals to the sub-nodes associated therewith Node 57 ... Node 59 and Node 61 ... Node 63 through the branching units BU60, BU57 ... BU59 and BU61 ... BU63, respectively, associated with the hub-node and the sub-nodes and the sub-node paths 112, 114, respectively. The sub-nodes are configured to receive the sub-node signals from their associated hub-nodes and decode signals on a specific wavelength associated with the sub-node.

Data transmitted from the sub-nodes, e.g. Node 57 ... Node 59 and Node 61 ... Node 63, and destined for the cable landing stations CLS1, CLS2, is modulated on the wavelength associated with the sub-node to provide sub-node signals. The sub-node signals are transmitted to the hub-nodes, e.g. Node 60, associated with the sub-nodes through the sub-node paths 112, 114, respectively, the branching units associated with the sub-node and any intervening branching units between the sub-node and the associated hub-nodes.

The hub-nodes, e.g. Node 60, associated with the sub-nodes Node 57 ... Node 59 and Node 61 ... Node 63 are configured to receive sub-node signals from the associated sub-nodes at specific wavelengths associated with the sub-nodes and decode the data on the sub-node signals. The hub-nodes, e.g. Node 60, modulate the data from the sub-nodes Node 57 ... Node 59 and Node 61 ... Node 63 along with data from the hub-node onto the wavelength associated with the hub-node and transmit that data as an aggregate signal to one or more of the cable landing stations CLS1, CLS2.

A configuration as shown for example in FIG. 1 may provide redundant communication from the sub-nodes to the cable landing stations CLS1, CLS2 by associating each of the sub-nodes with two different hub-nodes. One of the hub-nodes associated with a sub-node may transmit aggregate signals including sub-node data on its associated wavelength west to a first one of the cable landing stations e.g. CLS1, while the other hub-node associated with the sub-node may transmit the aggregate signals including the same sub-node data on its associated wavelength east to the other of the cable landing stations, CLS2. Likewise, data destined for each sub-node may be replicated at each cable landing station CLS1, CLS2 and sent to the sub-node through two different hub-nodes.

For example, Node 60 may be configured to send data received from Node 61 ... Node 63 east to the cable landing station CLS2, and to send data received from Node 57 ... Node 59 west to the cable landing station CLS1. Meanwhile, Node 56 may be configured to send data received from Node 57 ... Node 59 east to the cable landing station CLS2, and to send data received from other sub-nodes (not shown) west to the cable landing station CLS1. Node 64 may be configured to send data received from Node 61 ... Node 63 west to cable landing station CLS1. Data from the cable landing stations CLS1, CLS2 and destined for each sub-node may be replicated at each cable landing station and sent to the sub-nodes in the same way, i.e. through different associated hub-nodes. For example, data for Node 57 ... Node 59 may be sent from cable landing station CLS1 through Node 60 and also from cable landing station CLS2 through Node 56.

Communication between the cable landing stations CLS1, CLS2 and the hub-nodes (the hub-node network) through the trunk path 102 may be established using known high capacity transponders, while communication between the hub-nodes and their associated sub-nodes (the sub-node network) may be accomplished using known lower capacity transponders having a capacity (or data rate) lower than the transponders used in the hub-node network. For example, the hub-node network may operate at a data rate of 40 Gb/s or 100 Gb/s and the sub-node network may operate at a data rate of 10 Gb/s. The lower capacity transponders used in sub-node network may be known, readily available and relatively low cost transponders.

A system consistent with the present disclosure allows for a significant reduction in the number of optical amplifiers/repeaters compared to known systems wherein a branching unit associated with each node contributes loss on the trunk path. In one specific non-limiting example, a system including 64 nodes may nominally incur a 3 dB of loss for each of 64 branching units, resulting in a nominal loss on the trunk path of 192 dB for the 64 branching units alone. In a system consistent with the present disclosure, however, only the hub-nodes have associated branching units that contribute significant loss on the trunk path 102. In the system 100 shown in FIG. 1, for example, if the hub-nodes follow the illustrated pattern, there may be only 17 hub-nodes, resulting in a total nominal loss on the trunk path associated with branching units of 51 dB. The difference of 141 dB in loss between a known system and a system as shown for example in FIG. 1 may allow use of approximately nine fewer amplifiers/repeaters in a system consistent with the present disclosure. Although additional fibers are added to the cable 103 to provide the sub-node paths, e.g. paths 112, 114, between the hub-nodes and sub-nodes, the savings in the number of repeaters/amplifiers may offset the cost of the additional fibers. In addition, the number of wavelengths required on the trunk path 102 in a system consistent with the present disclosure may be significantly less than required in a known system where a wavelength is provided for each node.

A system consistent with the present disclosure may be implemented in a variety of configurations. For example, any number and configuration of hub-nodes and sub-nodes may be provided, depending on system constraints and requirements. Also, the hub-node network may be configured using branching units with any known optical add-drop multiplexer (OADM) configuration. The OADM configuration associated with a branching unit may be disposed within a housing associated with the branching unit, or may be physically separate therefrom and in a different housing from the branching unit. The term "branching unit" as used herein thus refers to any configuration of elements in a common or separate housing for dropping one or more signals from a trunk path to a branch path, adding one or more signals from a branch path to a trunk path, passing one or more signals from one trunk path segment to another trunk path segment and/or passing one or more signals from one branch path to another branch path.

Figure 2:
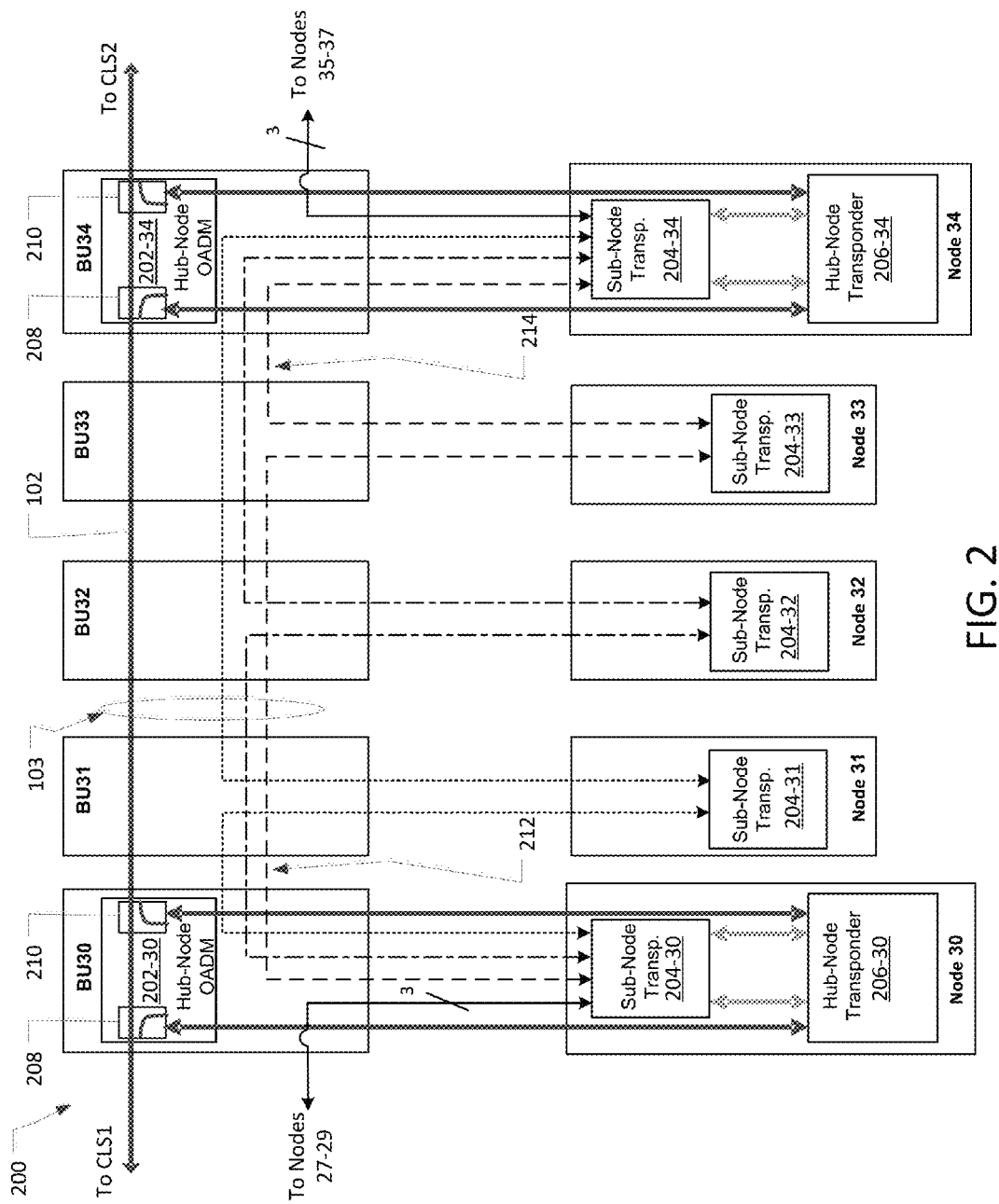
FIG. 2 is a schematic illustration of a portion of an example two-level optical communication system consistent with the present disclosure.

The sub-node network may be implemented using an OADM or non-OADM configuration. FIG. 2, for example illustrates a non-OADM configuration 200 of a sub-node network in a system consistent with the present disclosure. The configuration shown in FIG. 2 may be a portion of a system consistent with the present disclosure, e.g. a portion of the system 100 illustrated in FIG. 1, and includes consecutive hub-nodes, i.e. Nodes 30 and 34 and associated sub-nodes, i.e. Nodes 31 . . . 33. In the illustrated embodiment, branching units BU30 . . . BU34 are associated with Nodes 30-34, respectively.

The branching units BU30, BU34 associated with the hub-nodes, Node 30 and Node 34, respectively, include hub-node OADMs 202-30 and 202-34, respectively. The hub-node OADMs 202-30 and 202-34 include broadband couplers 208, 210 or wavelength-selective switches for coupling aggregate signals to/from the trunk path 102 to/from associated hub-node transponders 206-30, 206-34 in the hub-nodes Node 30, Node 34, respectively. The broadband couplers 208, 210 or wavelength-selective switches add to signal loss on the trunk path 102, e.g. about 3 dB in some embodiments, but ensure direct connectivity of signals from cable landing stations, e.g. CLS1 and CLS2 in FIG. 1, to the hub-nodes Node 30, Node 34. The branching units BU31 . . . BU33 associated with the sub-nodes, Node 31 . . . Node 33, respectively, do not add or drop signals from the trunk path 102 and thus do not contribute to signal loss on the trunk path 102.

The hub-node transponders 206-30, 206-34 are configured to send and receive aggregate signals to and/from the cable landing stations CLS1, CLS2 through the branching units BU30, BU34, e.g. at a relatively high data rate of, for example, 40 Gb/s or 100 Gb/s. The hub-node transponders 206-30, 206-34 decode the aggregate signals modulated on a single associated wavelength. The data encoded in the aggregate signals may be intended for the hub-nodes Node 30, Node 34 and one or more of the sub-nodes Node 31 . . . Node 33 and may be time-division multiplexed.

The hub-nodes 206-30, 206-34 include associated sub-node transponders 204-30, and 204-34, respectively. The hub-node transponders 206-30, 206-34 may decode and receive the data intended for the hub-node and may send data intended for the sub-nodes to the sub-node transponders 204-30, 204-34, respectively. The sub-node transponders 204-30, 204-34, respectively may modulate the data intended for the sub-nodes Node 31 . . . Node 33 to provide sub-node signals, and may transmit the sub-node signals to the associated sub-nodes Node 31 . . . Node 33 through associated sub-node paths 212 214 including direct-fiber connections within the branching units associated with the sub-nodes BU31-BU33. Sub-node signals associated with each sub-node Node 31 . . . Node 33 may be received by an associated sub-node transponder 204-31, 204-32, 204-33, respectively, within the sub-node. The sub-node transponders 204-31, 204-32, 204-33 within the sub-nodes may decode the sub-node signals received thereby. The sub-node transponders 204-31, 204-32, 204-33 may also be configured to send sub-node signals to the sub-node transponders 204-30, 204-34 within the hub-nodes Node 30, Node 34 through the sub-node paths 212, 214 and the branching units associated BU30 . . . BU34 with the sub-nodes and the hub-node. The sub-node transponders 204-31, 204-32, 204-33 in the sub-nodes may be configured to send and receive sub-node signals to/from the sub-node transponders 204-30, 204-34 in the hub-nodes Node 30, Node 34 at a relatively low data rate of, for example, 10 Gb/s.

Sub-node signals received by the sub-node transponders 204-30, 204-34 from the sub-nodes Node 31 . . . Node 33 may be decoded and provided to the hub-node transponders 206-30, 206-34, respectively. The hub-node transponders 206-30, 206-34 may aggregate data, e.g. using time-division multiplexing, from the sub-nodes and from the hub-node and modulate the data onto the wavelength associated with the hub-node to provide an aggregate signal. The hub-node transponder 206-30, 206-34 may transmit the aggregate signal on the trunk path 102 through the hub-node OADMs 202-30, 202-34.

To provide redundancy, data intended for the sub-nodes Node 31 . . . Node 33 may be provided to both hub-nodes Node 30 and Node 34 e.g. from CLS1 and CLS2 in FIG. 1, and transmitted to the sub-nodes Node 31 . . . Node 33 from both of the hub-nodes Node 30, Node 34. Likewise, data from the sub-nodes Node 31 . . . Node 33 may be provided to both of the hub-nodes Node 30, Node 34 and transmitted from the hub-nodes Node 30, Node 34 to the different cable landing stations, e.g. CLS1 and CLS2 in FIG. 1. Each of the hub-nodes Node 30, Node 34 may also communicate data to/from other sub-nodes adjacent thereto, e.g. Nodes 27-29 (not shown) and Nodes 35-37 (not shown), respectively.

Figure 3:
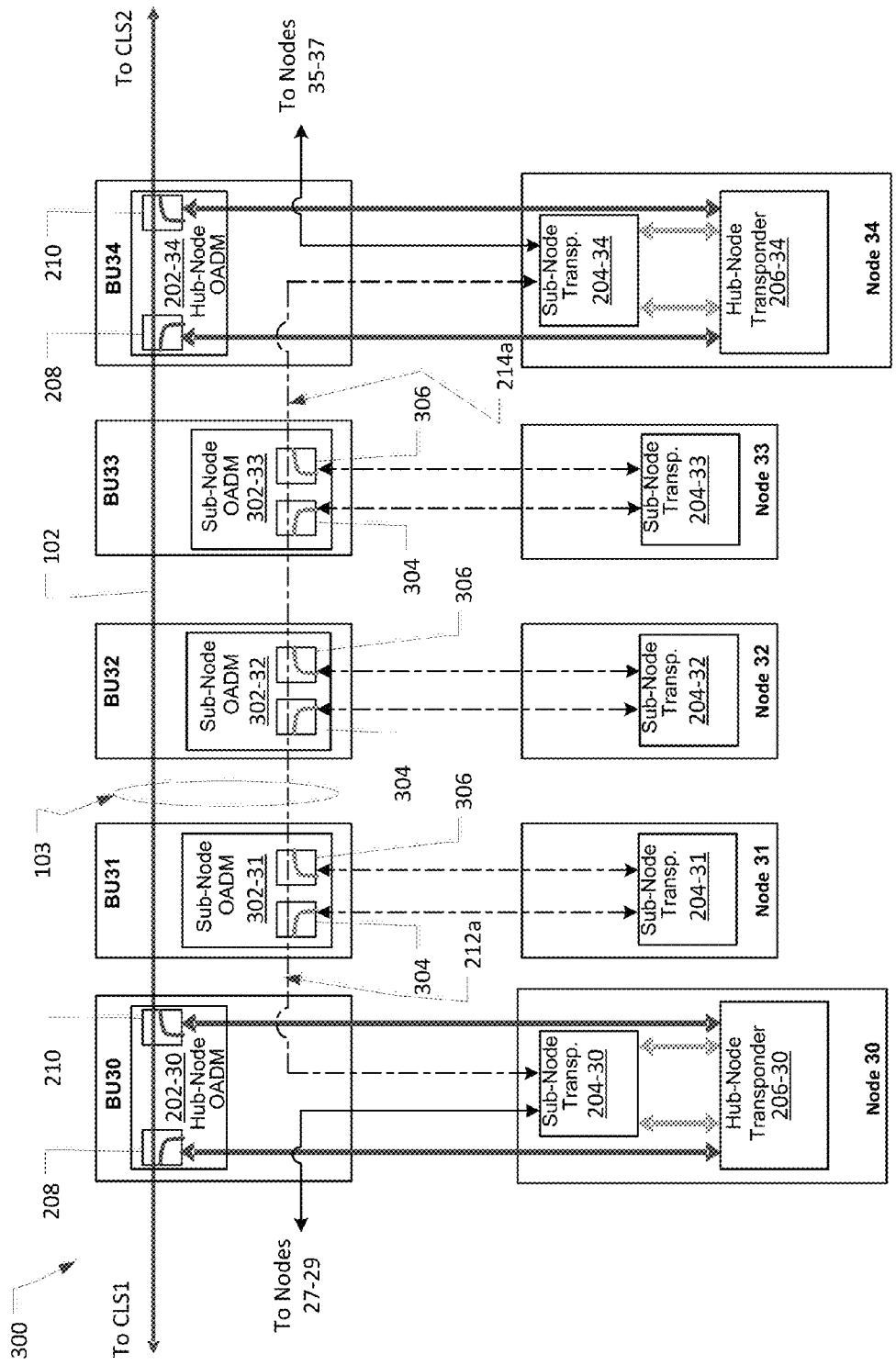
FIG. 3 is a schematic illustration of a portion of another example two-level optical communication system consistent with the present disclosure.

FIG. 3 illustrates one example 300 of a OADM configuration of a sub-node network in a system consistent with the present disclosure. The configuration shown in FIG. 3 may be a portion of a system consistent with the present disclosure, e.g. a portion of the system 100 illustrated in FIG. 1, and includes consecutive hub-nodes, i.e. Node 30 and Node 34 and associated sub-nodes, i.e. Node 31 . . . Node 33. In general, the configuration 300 of FIG. 3 differs from the configuration 200 shown in FIG. 2 in that the embodiment of FIG. 3 includes sub-node OADMs 302-31, 302-32 and 302-33 in the branching units BU31 . . . BU33, respectively, associated with the sub-nodes Node 31 . . . Node 33. Since the configuration and operation of other components illustrated in FIG. 3 is the same as those shown in FIG. 2, description thereof will not be repeated.

In the illustrated configuration 300, the sub-node transponders 204-30, 204-34 in the hub-nodes Node 30, Node 34, respectively, send and receive an aggregate signal to/from the sub-node transponders 204-31, 204-32, 204-33 in the sub-nodes Node 31 . . . Node 33 through the sub-node OADMs 302-31, 302-32 and 302-33, respectively. The aggregate signals to/from the sub-nodes Node 31 . . . Node 33 may be multiplexed on the sub-node paths 212a, 214a, each of which may include a single fiber pair. The sub-node OADMs 302-31, 302-32 and 302-33 include broad band couplers 304, 306 for coupling aggregate signals to/from associated sub-node transponders 204-31, 204-32, 204-33 through the sub-node paths 212a, 214a. This configuration may require only a single additional fiber pair in the optical cable 103 for establishing the sub-node paths 212a, 214a.

Figure 4:
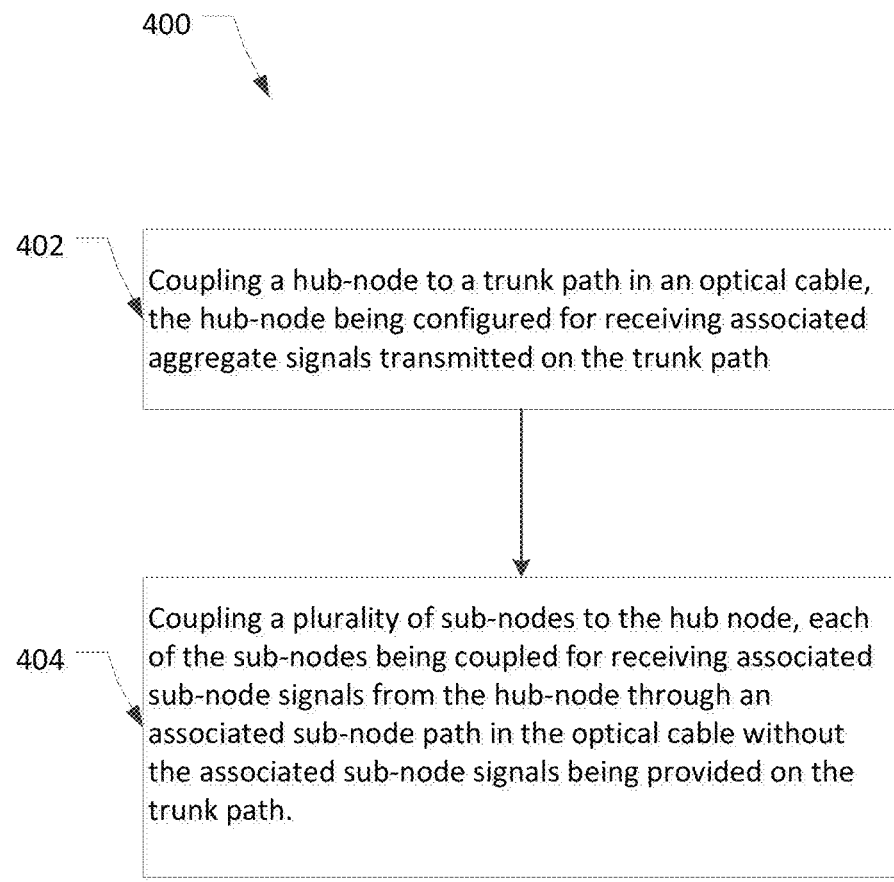
FIG. 4 is a flowchart illustrating one example of a method consistent with the present disclosure.

FIG. 4 is a block flow diagram for a method 400 of configuring an optical communication system consistent with the present disclosure. The illustrated block flow diagram may be shown and described as including a particular sequence of steps. The illustrated sequence of steps merely provides an example of how the general functionality described herein can be implemented. The steps do not have to be executed in the order presented unless otherwise indicated. In addition, it is to be understood that other embodiments consistent with the present disclosure may include sub-combinations of the illustrated steps and/or additional steps described herein. Thus, claims presented herein may be directed to all or part of the components and/or operations depicted in one or more figures.

The illustrated embodiment includes coupling 402 a hub-node to a trunk path in an optical cable, the hub-node being configured for receiving associated aggregate signals transmitted on the trunk path; and coupling 404 a plurality of sub-nodes to the hub-node, each of the sub-nodes being coupled for receiving associated sub-node signals from the hub-node through an associated sub-node path in the optical cable without the associated sub-node signals being provided on the trunk path.

Figure 5:
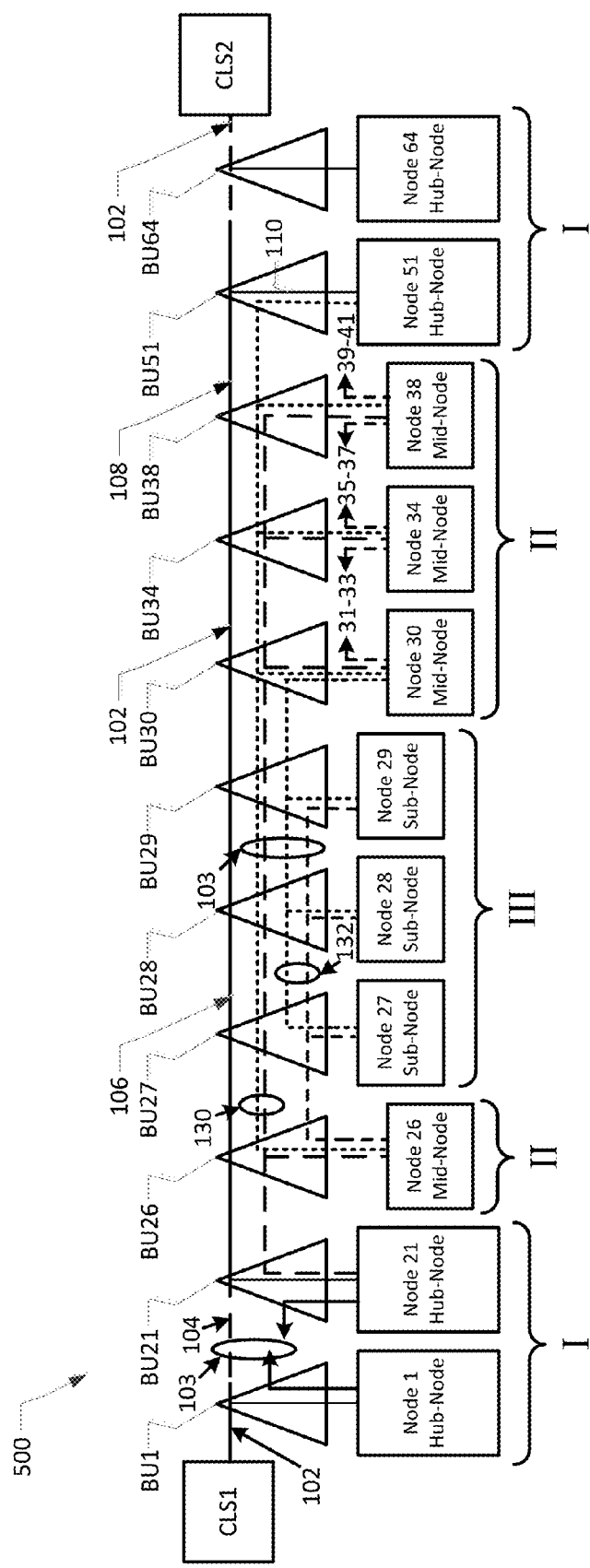
FIG. 5 is a schematic illustration of another example optical communication system having a three-level configuration consistent with the present disclosure.

Optical Communication System with Three-Level Hierarchy Architecture and Operation Turning now to FIG. 5, there is illustrated one example of an optical communication system 500 including a three-level configuration, consistent with the present disclosure. The optical system 500 has been depicted in highly simplified form for ease of explanation. The optical system 500 includes cable landings stations CLS1 and CLS2 coupled to a trunk path 102 in an optical cable 103, a plurality of branching units BU1 . . . BU64, and a plurality of nodes, Node 1 . . . Node 64.

In an embodiment, the optical cable 103 may be configured substantially similar to the optical cable 103 of FIG. 1. In particular, the optical cable 103 includes a plurality of interconnected optical cable segments, such as, cable segments 104, 106, and 108. Such cable segments may include one or more optical fiber pairs and may be coupled to one or more optical amplifiers, repeaters, or both. For ease of description and practicality, optical amplifiers and repeaters are not shown in the embodiment of FIG. 5.

The optical cable 103 may span a body of water. For example, when optical cable 103 spans a body of water, such as an ocean, the branching units BU1 . . . BU64 may be seated or otherwise positioned on the ocean floor, and optical cable 103 may span between cable landing stations CLS1 and CLS2 positioned at beach landings on opposite shores, or some distance from one another. The nodes, e.g., Node 1 . . . Node 64, may be disposed or otherwise positioned on land, or on offshore platforms such as oil drilling platforms, or both.

As shown, the optical system 500 includes three levels, levels I-III, respectively. Nodes of the first level (level I) include nodes such as, for example, Node 1, Node 21, Node 51, and Node 64, with each configured as hub-nodes, and may be generally referred to herein as such. Nodes of the second level (level II), for example, Node 26, 30, 34, and 38, are configured as mid-nodes, and may be generally referred to herein as such. Nodes of the third level (level III) such as, for example, Nodes 27 . . . 29, 31 . . . 33, 35 . . . 37, and 39 . . . 41 are configured as sub-nodes, and may be generally referred to herein as such. Note for the purpose of simplicity, nodes 31 . . . 33, 35 . . . 37, and 39 . . . 41 are illustrated in an abbreviated form. However, these sub-nodes can include sub-node paths provided by mid-nodes 30, 34, and 38, for example. In any event, aspects and embodiments discussed herein with regard to sub-nodes 27 . . . 29 are equally applicable. Moreover, although the illustrated exemplary embodiment includes sixty-four nodes, Node 1 . . . Node 64, and associated branching units BU1 . . . BU64, any number of nodes and branching units may be provided in a system consistent with the present disclosure.

Each of the hub-nodes such as, for example, Node 1, 21, 51, and 64, are coupled to the trunk path 102 by an associated branch path. For example, path 110 is associated with Node 51, and an associated branching unit BU51. Of the branching units BU1 . . . BU64, only the branching units such as, for example, BU1, BU21, BU51, and BU64, associated with hub-nodes contribute loss on the trunk path 102 because only the branching units associated with the hub-nodes are configured to add/drop signals to/from the trunk path 102.

Each of the mid-nodes such as, for example, Nodes 26, 30, 34, and 38, are coupled to one or more of the hub-nodes through an associated branching unit such as, for example, BU26, BU30, BU34, and BU38, respectively. The branching units such as, for example, BU26, BU30, BU34, and BU38, associated with the mid-nodes do not add/drop signals to/from the trunk path and do not contribute significant loss on the trunk path. Similarly, each of the sub-nodes such as, for example, Nodes 27 . . . 29, 31 . . . 33, 35 . . . 37, are coupled to one or more of the mid-nodes through an associated branching unit, such as BU27 associated with Node 27. The branching units associated with the sub-nodes, such as BU28, do not add/drop signals to/from the trunk path and do not contribute significant loss on the trunk path.

In general, the branching unit such as, for example, BU51, associated with each hub-node such as, for example, Node 51, is configured to drop one or more aggregate signals to the associated hub-node. The hub-node may be configured to receive the aggregate signals from its associated branching unit and decode the signal on a specific associated wavelength. Each hub-node is configured to decode aggregate signals on a different wavelength from the others of the hub-nodes.

The aggregate signals decoded by each hub-node may include data designated for the hub-node, or data designated for one or more associated mid-nodes that are coupled to the hub-node, or both. The data designated for the hub-node may be received by the hub-node. The data from the aggregate signal and designated for the mid-nodes may be modulated on wavelengths associated with the mid-nodes and transmitted by the hub-node to the mid-nodes as associated mid-node signals. The mid-node signals may be transmitted from the hub-node to the mid-nodes associated therewith through the branching units associated with the hub-node and the mid-node and through an associated mid-node path. For example, one such mid-node path 130 extends from hub-nodes 21 and 51 to mid-node 26 and 38, respectively. Mid-node paths may include one or more dedicated fiber pairs within the cable 103, on which mid-node signals are transmitted from the hub-node to the associated mid-node, or may include single path within the cable 103 on which mid-node signals for multiple mid-nodes are multiplexed for transmission from the hub-node to the mid-nodes, or both.

The mid-node signals received by mid-nodes may include data designated for the particular mid-node, or data designated for one or more associated sub-nodes that are coupled to the mid-node, or both. The data designated for the mid-node may be received by a given mid-node. The data from the aggregate signal and designated for the sub-nodes may be modulated on wavelengths associated with the sub-nodes and transmitted by the mid-node to the sub-nodes as associated sub-node signals. The sub-node signals may be transmitted from the mid-node to the sub-nodes associated therewith through the branching units associated with the mid-node, and the sub-node and through an associated sub-node path. For example, one such sub-node path 132 extends from mid-nodes 26 and 30 to sub-nodes 27 . . . 29, respectively. Sub-node paths may include one or more dedicated fiber pairs within the cable 103, on which sub-node signals are transmitted from the mid-node to the associated sub-node(s), or may include single path within the cable 103 on which sub-node signals for multiple mid-nodes are multiplexed for transmission from the mid-node to the sub-nodes, or both.

Note that mid-node path 130 extends to multiple mid-nodes. It should be appreciated that any number of mid-nodes may be present within the optical system 500 and the number shown should not be construed as limiting. Also note that sub-node path 132 extends to three sub-nodes, but this disclosure is not limited in this regard. For instance, a sub-node path 132 may include more than three sub-nodes, or less as the case may be.

Further note that each mid-node path, such as mid-node path 130, and sub-node path 132, for example, may be within the optical cable 103, but do not include or otherwise utilize any portion of the trunk path 102. With this configuration, mid-node signals to/from the mid-nodes may be sent to/from the hub-nodes without being provided on the trunk path 102. Likewise, sub-node signals to/from the sub-nodes may be sent to/from the mid-nodes without being provided on the trunk path 102. As should be appreciated in light of this disclosure, this may avoid trunk path loss such as, for example branching unit loss, associated with communicating mid-node signals to/from the mid-nodes and sub-node signals to/from the sub-nodes.

The mid-nodes such as, for example, Nodes 26, 30, 34, 38, may be configured to receive mid-node signals from their associated hub-nodes and decode mid-node signals on a specific wavelength associated with the mid-node. Mid-node signals transmitted from a mid-node and destined for the cable landing stations CLS1, CLS2, may be modulated on the wavelength associated with the mid-node and transmitted to the hub-nodes associated with the mid-node through the associated mid-node path. In a similar fashion sub-node signals transmitted from a sub-node and destined for the cable landing stations CLS1, CLS2, may be modulated on the wavelength associated with the sub-node and transmitted to the mid-nodes associated with the sub-node through the associated sub-node path.

The hub-nodes associated with the mid-nodes may be configured to receive mid-node signals from the associated mid-nodes at specific wavelengths associated with the mid-nodes, and decode the data on the mid-node signals. In some cases, the hub-nodes modulate the data from the mid-node signals along with data from the hub-node onto the wavelength associated with the hub-node, and transmit an associated aggregate signal to one or more of the cable landing stations CLS1, CLS2.

In a similar fashion, the mid-nodes associated with sub-nodes may be configured to receive sub-node signals from the associated sub-nodes at specific wavelengths associated with the sub-nodes, and decode the data on the sub-node signals. In some cases, the mid-nodes modulate the data from the sub-node signals along with data from the mid-node onto the wavelength associated with the mid-node, and transmit an associated aggregate signal to one or more hub-nodes, which then ultimately transmit the aggregate signal to one or more of the cable landing stations CLS1, CLS2.

As shown, hub-node nodes such as, for example, Nodes 1 and Node 64, that are adjacent the cable landing stations, CLS1, CLS2, may be configured to support communication between one or more of the cable landing stations CLS1, CLS2 and those mid-nodes adjacent thereto (not shown). The optical system 500 may include at least 4 mid-nodes adjacent a given CLS, although other embodiments will be apparent in light of this disclosure. The remaining of the hub-nodes may be configured to support a number of mid-nodes preceding the hub-node and a number of mid-nodes following the hub-node. In an embodiment, the optical system 500 may include at least four mid-nodes preceding each hub-node and at least four mid-nodes following each hub-node, although other numbers of preceding/following mid-nodes will be apparent in light of this disclosure.

Additional fibers pairs may be provided in the optical cable 103 to establish the mid-node paths between the hub-nodes and their associated mid-nodes. For example, in the illustrated embodiment of FIG. 5, one or more additional fiber pairs may be provided in the optical cable 103 to establish a first portion of mid-node path 130 connecting mid-nodes 26, 30, 34, 38 to hub-node 21, and one or more additional fiber pairs may be provided in the optical cable 103 to establish a second portion of the mid-node path 130 connecting mid-nodes 26, 30, 34, 38 to hub-node 51.

Likewise, additional fibers pairs may be provided in the optical cable 103 to establish the sub-node paths between the sub-nodes and their associated mid-nodes and sub-nodes. For example, in the illustrated embodiment of FIG. 5, one or more additional fiber pairs may be provided in the optical cable 103 to establish a first portion of sub-node path 132 connecting sub-nodes 27, 28 and 29 to mid-node 26, and one or more additional fiber pairs may be provided in the optical cable 103 to establish a second portion of the sub-node path 132 connecting sub-nodes 27, 28, and 29 to mid-node 30. The optical system 500 may include similarly constructed sub-node paths between sub-nodes 31 . . . 33, 35 . . . 37, and 39 . . . 41 associated with respective mid-nodes 30, 34 and 38.

Again, FIG. 5 is one example of a configuration consistent with the present disclosure. It is to be understood that a system consistent with the present disclosure may support any number and arrangement of hub-nodes, mid-nodes, sub-nodes.

With continued reference to the system 500 illustrated in FIG. 5, the hub-node identified as Node 51, for example, may be configured to receive signals from the trunk path 102 through its associated branching unit, BU51 and branch path 110, and decode an aggregate signal on a specific associated wavelength. The aggregate signal decoded by the hub-node BU51 may include data designated for the hub-node BU51, or data designated for the mid-nodes 26, 30, 34, and 38 that are coupled to the hub-node 51, or both. Data designated for the mid-nodes coupled to the hub-node may be transmitted from the hub-node 51 as mid-node signals to the mid-nodes associated therewith. For instance, some such nodes configured to receive mid-node signals include, for example, mid-nodes 26, 30, 34, and 38, and can receive those signals through the branching units associated with the hub-node 51, and the mid-nodes and the mid-node path 130. The mid-nodes may be configured to receive the mid-node signals from their associated hub-nodes and decode signals on a specific wavelength associated with the mid-node.

Likewise, the sub-node signal received by a particular mid-node may include data designated for that mid-node, or data designated for a sub-node, or both. Data designated for the sub-nodes coupled to the particular mid-node may be transmitted from the mid-node as sub-node signals to the sub-nodes associated therewith. For instance, some such nodes configured to receive sub-node signals include, for example, sub-nodes 27, 28 and 29, and can receive those signals through associated branching units, and the sub-nodes and the sub-node path 132. The sub-nodes may be configured to receive the sub-node signals from their associated mid-nodes and decode signals on a specific wavelength associated with the sub-node.

Figure 6:
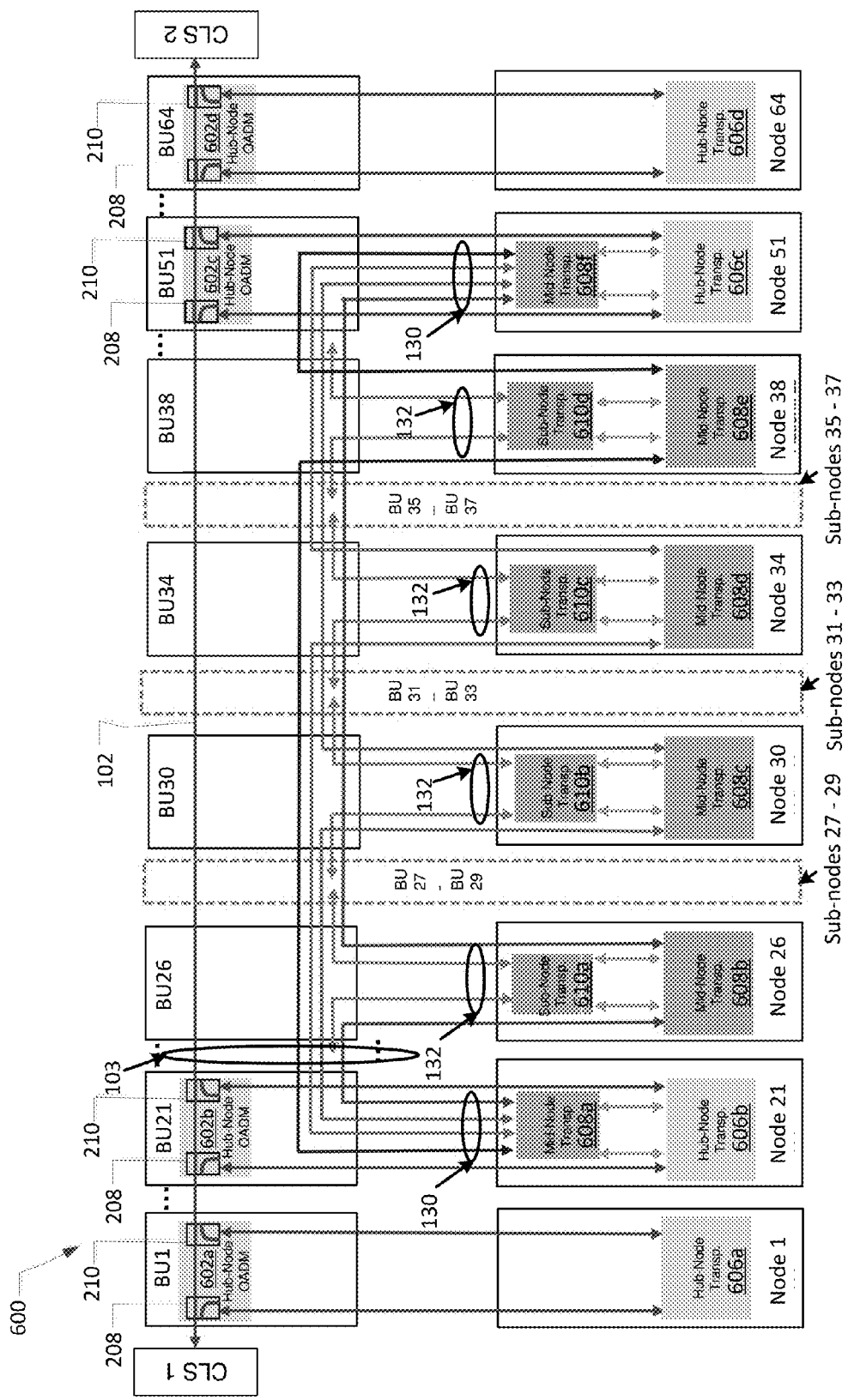
FIG. 6 is a schematic illustration of a portion of an example three-level optical communication system consistent with the present disclosure.

In an embodiment, sub-node and mid-node networks formed by mid-node path 130 and sub-node path 132, respectively, may be implemented using an optical add/drop multiplexer (OADM), or non-OADM configuration. FIG. 6, for example, illustrates a non-OADM mid-node configuration 600 of an optical system with a three-level configuration consistent with the present disclosure. The configuration shown in FIG. 6 may be a portion of a system consistent with the present disclosure such as, for example, a portion of the system 500 illustrated in FIG. 5, and includes consecutive hub-nodes 21 and 51 (e.g., level I), associated mid-nodes 26 (e.g., level II), 30, 34, and 38, and associated sub-nodes 27 . . . 29, 31 . . . 33, and 35 . . . 37 (e.g., level III). In the illustrated embodiment, branching units BU1 . . . BU64 are associated with Nodes 1-64, respectively.

The optical system 600 includes a CLS1 and CLS2 communicatively coupled with BU1 . . . BU64, there between, via trunk path 102. As shown, BU1, BU21, BU51, and BU64, are associated with hub-nodes, and more particularly, hub-nodes 1, 21, 51, and 64. The BU associated with hub-nodes comprise hub-node OADMs 602a . . . 602d, respectively. The hub-node OADMs 602a . . . 602d can include broadband couplers 208, 210 or wavelength-selective switches for coupling aggregate signals to/from the trunk path 102 to/from associated hub-node transponders 606a . . . 606d. The broadband couplers 208, 210 or wavelength-selective switches may add to signal loss on the trunk path 102. For example about 3 dB of loss may be introduced in some circumstances. However, this ensures direct connectivity of signals from cable landing stations CLS1 and CLS2 to the hub-nodes 1 and 64. The branching units associated with the sub-nodes 27 . . . 29, 31 . . . 33, and 35 . . . 37, respectively, and mid-nodes 26, 30, 34, and 38 advantageously do not add or drop signals from the trunk path 102, and thus do not contribute to signal loss on the trunk path 102.

The hub-nodes 1, 21, 51 and 64 may include associated hub-node transponders 606a . . . 606d. The hub-node transponders 606a . . . 606d are configured to send and receive aggregate signals to and/from the cable landing stations CLS1, CLS2 through the branching units BU1, BU21, BU51, BU64, at a relatively high data rate of, for example, 40 Gb/s or 100 Gb/s. The hub-node transponders 606a . . . 606d may decode the aggregate signals modulated on a single associated wavelength. The data encoded in the aggregate signals may be intended for at least one of the hub-node(s), one or more mid-node(s), and one or more sub-node(s), and may be time-division multiplexed.

The hub-nodes 21 and 51 may include associated mid-node transponders 608a and 608f, respectively. The hub-node transponders 606b and 606c, respectively, may decode and receive the data intended for the hub-node and may also send data intended for the mid-nodes to the mid-node transponders 608a . . . 608f respectively. The mid-node transponders 608a . . . 608f, respectively, may modulate the data intended for the mid-nodes to provide mid-node signals, and may transmit the mid-node signals to the associated mid-nodes through associated mid-node paths 130, and may utilize direct-fiber connections within the branching units associated with the mid-nodes. Mid-node signals associated with each mid-node may be received by an associated mid-node transponder 608a . . . 608f, respectively. The mid-node transponders 608b . . . 608e within the mid-nodes may decode the mid-node signals received thereby. The mid-node transponders 608b . . . 608e may also be configured to send mid-node signals to the mid-node transponders (e.g., mid-node transponders 608a and 6080 within the hub-nodes 21 and 51 through the mid-node paths 130, and the branching units associated with the mid-nodes and the hub-nodes. The mid-node transponders in the mid-nodes (e.g., mid-node transponders 608b . . . 608e) may be configured to send and receive mid-node signals to/from the mid-node transponders in the hub-nodes (e.g., hub-nodes 21 and 51) at a relatively low data rate of, for example, 10 Gb/s.

The mid-nodes 26, 30, 34, and 38 may include associated sub-node transponders 610a . . . 610d, respectively. Additional sub-node transponders may be included in sub-nodes 27 . . . 29, 31 . . . 33, 35 . . . 37, but are not shown merely for clarity and practicality. The sub-node transponders may decode and receive the data intended for the sub-nodes and may also send data intended for the sub-nodes to the sub-node transponders. The sub-node transponders may modulate the data intended for the sub-nodes to provide sub-node signals, and may transmit the sub-node signals to the associated sub-nodes through associated sub-node paths 132, and may utilize direct-fiber connections within the branching units associated with the sub-nodes. Sub-node signals associated with each sub-node may be received by an associated sub-node. The sub-node transponders 610a . . . 610d within the mid-nodes 26, 30, 34 and 38, respectively, may decode the sub-node signals received thereby. The sub-node transponders in the sub-nodes 27 . . . 29, 31 . . . 33, 35 . . . 37 may also be configured to send sub-node signals to the sub-node transponders within the mid-nodes 26, 30, 34 and 38, through the sub-node paths 132, and the branching units associated with the sub-nodes and the mid-nodes. The sub-node transponders in the sub-nodes 27 . . . 29, 31 . . . 33, 35 . . . 37 may be configured to send and receive sub-node signals to/from the sub-node transponders in the mid-nodes at a relatively low data rate of, for example, 10

Gb/s. In an embodiment, the sub-node transponders may send and receive sub-node signals to/from the sub-node transponders on the sub-node path 132 at a data rate lower than the data rate configured in the mid-node path 130.

Sub-node signals received by the sub-node transponders from the sub-nodes may be decoded and provided to the mid-node transponders such as, for example, mid-node transponders 608a and 608f. Mid-node signals received by the mid-node transponders 608a . . . 608f from the mid-nodes (or sub-node signals from sub-nodes) may be decoded and provided to the hub-node transponders 606a . . . 606d, respectively. The hub-node transponders 606a . . . 606d may aggregate data for example, using time-division multiplexing, to multiplex signals from the sub-nodes, mid-nodes and from the hub-node, and modulate that data onto the wavelength associated with the hub-node to provide an aggregate signal. The hub-node transponder 606a . . . 606d may transmit the aggregate signal on the trunk path 102 through the hub-node OADMs 602a . . . 602d, for example.

To provide redundancy, data intended for the sub-nodes/mid-nodes may be provided to both hub-nodes 21 and 51 from CLS1 and CLS2 in FIG. 5, and transmitted to the mid-node 26 from both of the hub-nodes 21 and 51, and to a particular sub-node, as the case may be. That data is then decoded and transmitted to a respective mid-node/sub-node, or other destination for that data. Likewise, data from the sub-nodes may be provided to a respective mid-node, and from there, transmitted from the hub-nodes to the different cable landing stations CLS1 and CLS 2, as shown in FIG. 5. Each of the hub-nodes may also communicate data to/from other mid-nodes, and associated sub-nodes, adjacent thereto.

Figure 7:
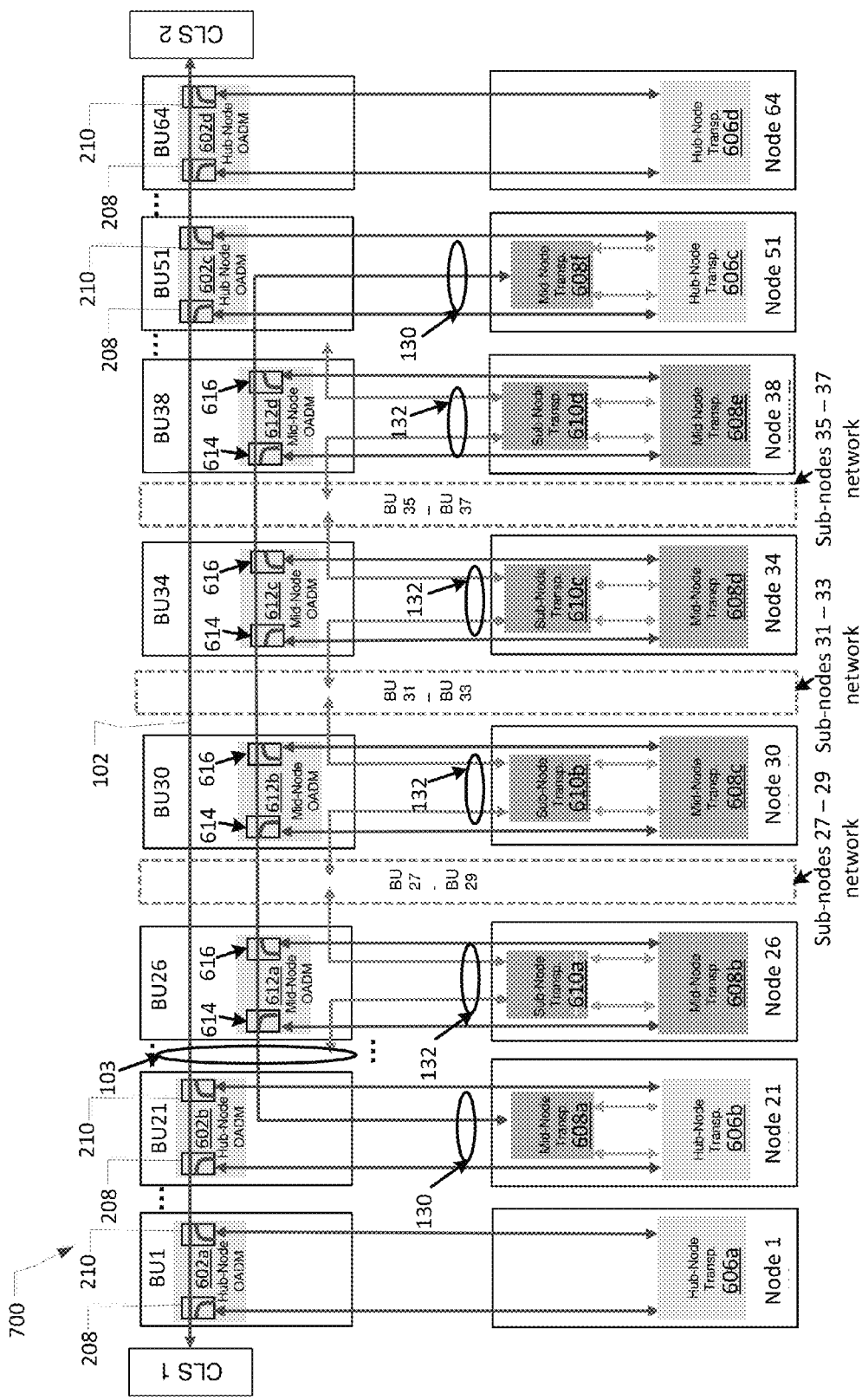
FIG. 7 is a schematic illustration of a portion of another example three-level optical communication system consistent with the present disclosure.

FIG. 7 illustrates one example 700 of a OADM configuration of a mid-node network (paths) coupled to associated sub-node networks (paths) in a system consistent with the present disclosure. The configuration shown in FIG. 7 may be a portion of a system consistent with the present disclosure, e.g. a portion of the system 500 illustrated in FIG. 5, and includes consecutive hub-nodes (e.g. Level I), associated mid-nodes (e.g., Level II), and associated sub-nodes (e.g., Level III). In general, the configuration 700 of FIG. 7 differs from the configuration 600 shown in FIG. 6 in that the embodiment of FIG. 7 includes mid-node OADMs 612a . . . 612d in the branching units BU26, BU30, BU34, and BU38, respectively. Since the configuration and operation of other components illustrated in FIG. 7 is similar to that shown in FIG. 6, description thereof will not be repeated.

In the illustrated configuration 700, the mid-node transponders 608a and 608f in the hub-nodes 21 and 51, respectively, send and receive an aggregate signal to/from the mid-node transponders 608b . . . 608e in the mid-nodes 26, 30, 34 and 38 through the mid-node OADMs 612a . . . 612d, respectively. The aggregate signals to/from the mid-nodes may be multiplexed on the mid-node paths 130, each of which may include a single fiber pair. The mid-node OADMs 612a . . . 612d may include broadband couplers 614 and 616 or wavelength-selective switches for coupling aggregate signals to/from associated mid-node transponders through the mid-node paths 130. This configuration may require only a single additional fiber pair in the optical cable 103 for establishing the mid-node paths 130.

As also illustrated in configuration 700, the sub-node transponders 610a . . . 610d in the mid-nodes 26, 30, 34 and 38, respectively, send and receive an aggregate signal to/from the sub-node transponders in sub-nodes 27 . . . 29, 31 . . . 33, and 35 . . . 37 (not shown). The aggregate signals to/from the sub-nodes may be multiplexed on the sub-node paths 132, and each of which may include a single fiber pair. These sub-nodes may be configured with OADMs (not shown) that may include broadband couplers, such as shown in FIG. 3. Alternatively, the sub-nodes may be configured with wavelength-selective switches. This may allow for coupling of aggregate signals to/from associated sub-node transponders through the sub-node paths 132. This configuration may require only a single additional fiber pair in the optical cable 103 for establishing the sub-node paths 132.

Figure 8:
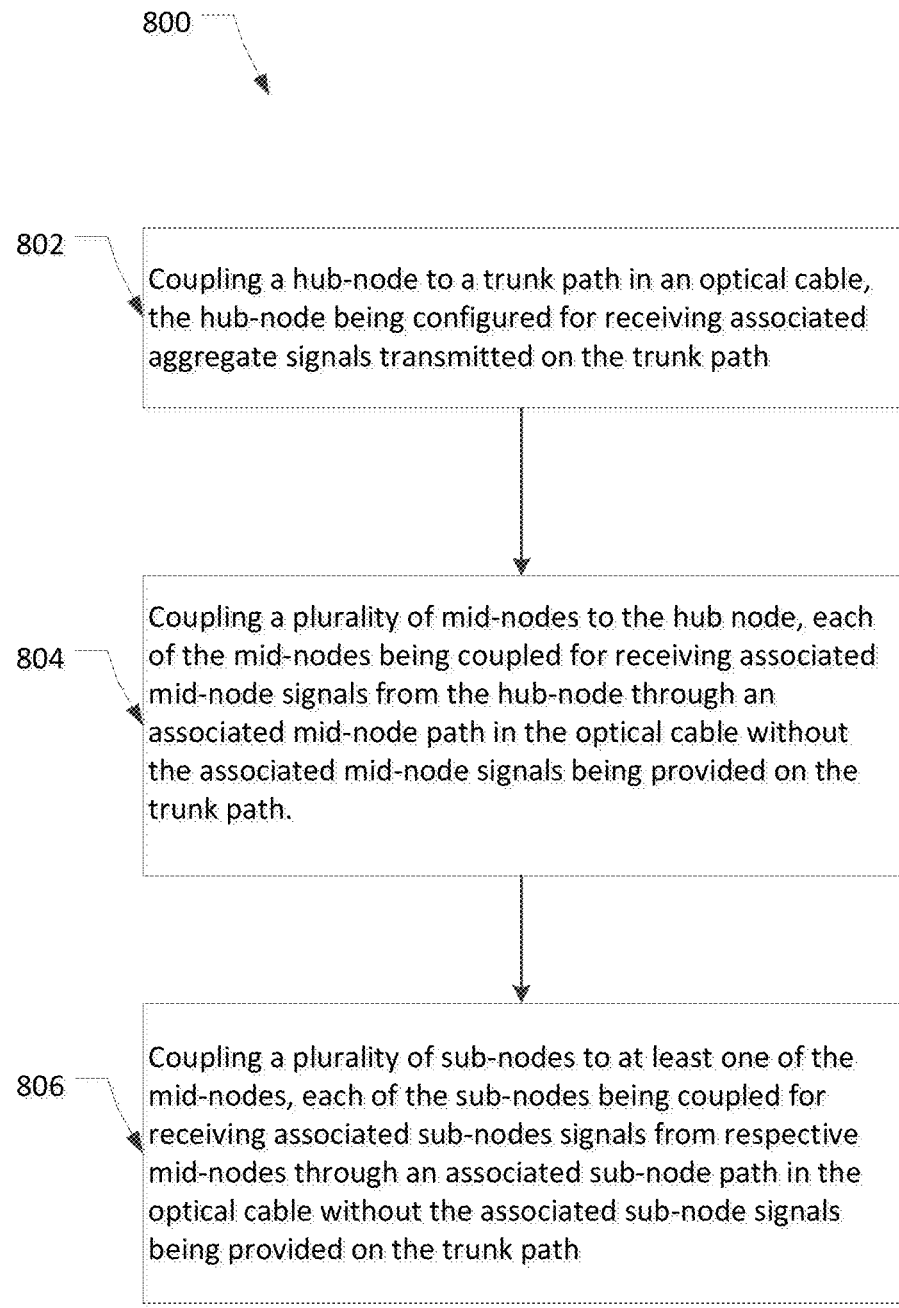
FIG. 8 is a flowchart illustrating another example of a method consistent with the present disclosure.

FIG. 8 is a block flow diagram for a method 800 of configuring an optical communication system consistent with the present disclosure. The illustrated block flow diagram may be shown and described as including a particular sequence of steps. The illustrated sequence of steps merely provides an example of how the general functionality described herein can be implemented. The steps do not have to be executed in the order presented unless otherwise indicated. In addition, it is to be understood that other embodiments consistent with the present disclosure may include sub-combinations of the illustrated steps and/or additional steps described herein. Thus, claims presented herein may be directed to all or part of the components and/or operations depicted in one or more figures.

The illustrated embodiment includes coupling 804 a hub-node to a trunk path in an optical cable, the hub-node being configured for receiving associated aggregate signals transmitted on the trunk path; coupling 804 a plurality of mid-nodes to the hub-node, each of the mid-nodes being coupled for receiving associated mid-node signals from the hub-node through an associated mid-node path in the optical cable without the associated mid-node signals being provided on the trunk path; and coupling 806 a plurality of sub-nodes to at least one of the mid-nodes, each of the sub-nodes being coupled for receiving associated sub-nodes signals from respective mid-nodes through an associated sub-node path in the optical cable without the associated sub-node signals being provided on the trunk path.

According to one aspect of the present disclosure there is provided an optical communication system including first and second cable landing stations coupled to a trunk path in an optical cable; at least one hub-node, each of the hub-nodes being coupled to the trunk path through an associated hub-node branching unit; and at least one sub-node, each of the sub-nodes being coupled to at least one of the hub-nodes through an associated sub-node branching unit and an associated sub-node path in the optical cable, the sub-node path not including the trunk path whereby sub-node signals may be communicated between each of the sub-nodes and the at least one of the hub-nodes coupled thereto without being provided on the trunk path.

According to another aspect of the present disclosure, there is an optical communication system: first and second cable landing stations coupled to a trunk path in an optical cable; a hub-node coupled to the trunk path through an associated hub-node branching unit for receiving associated aggregate signals from at least one of the first and second cable landing stations, the associated aggregate signals comprising associated sub-node data, the hub-node being configured to provide sub-node signals; and a plurality of sub-nodes, each of the sub-nodes being coupled to the hub-node through an associated sub-node branching unit and a sub-node path in the optical cable, whereby each of the sub-nodes is configured for receiving an associated one of the sub-node signals through the sub-node path without the associated ones of the sub-node signals being provided on the trunk path.

According to another aspect of the disclosure, there is provided a method of configuring an optical communication system: coupling a hub-node to a trunk path in an optical cable, the hub-node being configured for receiving associated aggregate signals transmitted on the trunk path; and coupling a plurality of sub-nodes to the hub-node, each of the sub-nodes being coupled for receiving associated sub-node signals from the hub-node through an associated sub-node path in the optical cable without the associated sub-node signals being provided on the trunk path.

According to yet another aspect of the disclosure, there is provided an optical communication system comprising: first and second cable landing stations coupled to a trunk path in an optical cable; at least one hub-node, each of the hub-nodes being coupled to the trunk path through an associated hub-node branching unit; at least one mid-node, each of the mid-nodes being coupled to at least one of the hub-nodes through an associated mid-node branching unit and an associated mid-node path in the optical cable, the mid-node path not including the trunk path whereby mid-node signals may be communicated between each of the mid-nodes and the at least one of the hub-nodes coupled thereto without being provided on the trunk path; and at least one sub-node, each of the sub-nodes being coupled to at least one of the mid-nodes through an associated sub-node branching unit and an associated sub-node path in the optical cable, the sub-node path not including the trunk or mid-node path whereby sub-node signals may be communicated between each of the sub-nodes and the at least one of the mid-nodes coupled thereto without being provided on the trunk or mid-node path.

In the optical communication system each of the sub-nodes may coupled to first and second ones of the mid-nodes through the associated sub-node branching unit, and first and second sub-nodes of the associated sub-node path, and wherein the sub-node branching units may directly connect optical fibers to provide the associated sub-node path.

In the optical communication system each of the sub-nodes may be coupled to first and second ones of the mid-nodes through the associated sub-node branching unit and first and second sub-nodes of the associated sub-node paths, and wherein the sub-node branching units may comprise an optical add-drop multiplexer to provide the associated sub-node paths.

In the optical communication system each of the mid-nodes may be configured to send and receive aggregate signals on the mid-node path at a first data rate, and to send and receive sub-node signals to and from ones of the sub-nodes coupled thereto at a second data rate lower than the first data rate.

In the optical communication system each of the mid-nodes may be configured to send and receive aggregate signals to and from the mid-node path on a different associated wavelength.

In the optical communication system at least one of the associated mid-node branching units may directly connect optical fibers to provide the associated mid-node path.

In the optical communication system at least one of the associated mid-node branching units may comprise an optical add-drop multiplexer.

In the optical communication system at least one of the hub-nodes may comprise a hub-node transponder configured for sending and receiving aggregate signals to and from the trunk path, and a mid-node transponder configured for sending and receiving mid-node signals to and from the associated mid-node path.

In the optical communication system at least one of the mid-nodes may comprise a mid-node transponder configured for sending and receiving aggregate signals to and from the mid-node path, and a sub-node transponder configured for sending and receiving sub-node signals to and from the associated sub-node path.

According to still yet another aspect of the disclosure, there is provided an optical communication system comprising: first and second cable landing stations coupled to a trunk path in an optical cable; a hub-node coupled to the trunk path through an associated hub-node branching unit for receiving first associated aggregate signals from at least one of the first and second cable landing stations, the first associated aggregate signals comprising associated mid-node data, the hub-node being configured to provide mid-node signals; a plurality of mid-nodes, each of the mid-nodes being coupled to the hub-node through an associated mid-node branching unit and a mid-node path in the optical cable, whereby each of the mid-nodes is configured for receiving an associated one of the mid-node signals through the mid-node path without the associated ones of the mid-node signals being provided on the trunk path; and a plurality of sub-nodes, each of the sub-nodes being coupled to the mid-node through an associated sub-node branching unit and a sub-node path in the optical cable, whereby each of the sub-nodes is configured for receiving an associated one of the sub-node signals through the sub-node path without the associated ones of the sub-node signals being provided on the trunk or mid-node path.

The optical system may further comprise a second hub-node coupled to the trunk path through a second associated hub-node branching unit for receiving second associated aggregate signals from at least one of the first and second cable landing stations, the second associated aggregate signals comprising second associated mid-node data, the second hub-node being configured to provide second mid-node signals, wherein a plurality of mid-nodes are coupled to the second hub-node through the associated mid-node branching units and a second mid-node path in the optical cable, whereby each of the mid-nodes is configured for receiving an associated one of the second mid-node signals through the second mid-node path without the associated ones of the second mid-node signals being provided on the trunk path.

In the optical communication system the first and second hub-nodes may be configured to receive the first aggregate signals and the second aggregate signals, respectively, on different associated wavelengths.

In the optical communication system the hub-node may be configured to receive the first aggregate signals at a first data rate and to send associated ones of the mid-node signals on the mid-node path at a second data rate lower than the first data rate.

In the optical communication system the at least one of the mid-node branching units may directly connect optical fibers to provide the associated mid-node path.

In the optical communication system at least one of the associated mid-node branching units may comprise an optical add-drop multiplexer.

In the optical communication system the mid-node may comprise a mid-node transponder configured for sending and receiving aggregate signals to and from the mid-node path, and a sub-node transponder configured for sending and receiving the sub-node signals to and from the sub-node path.

In the optical communication system the hub-node may comprise a hub-node transponder configured for sending and receiving aggregate signals to and from the trunk path, and a mid-node transponder configured for sending and receiving the mid-node signals to and from the mid-node path.

And according to still yet another aspect of the disclosure, there is provided method of configuring an optical communication system: coupling a hub-node to a trunk path in an optical cable, the hub-node being configured for receiving first associated aggregate signals transmitted on the trunk path; coupling a plurality of mid-nodes to the hub-node, each of the mid-nodes being coupled for receiving associated mid-node signals from the hub-node through an associated mid-node path in the optical cable without the associated mid-node signals being provided on the trunk path; and coupling a plurality of sub-nodes to at least one of the mid-nodes, each of the sub-nodes being coupled for receiving associated sub-node signals from respective mid-nodes through an associated sub-node path in the optical cable without the associated sub-node signals being provided on the trunk path or the mid-node path.

The method may further comprise coupling a second hub-node to the trunk path, the second hub-node being configured for receiving second associated aggregate signals transmitted on the trunk path, each of the plurality of mid-nodes being coupled for receiving associated second mid-node signals from the second hub-node through a second associated mid-node path in the optical cable without the associated second mid-node signals being provided on the trunk path.

In the method the first and second hub-nodes may be configured to receive the first aggregate signals and the second aggregate signals, respectively, on different associated wavelengths.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Elements, components, modules, and/or parts thereof that are described and/or otherwise portrayed through the figures to communicate with, be associated with, and/or be based on, something else, may be understood to so communicate, be associated with, and/or be based on in a direct and/or indirect manner, unless otherwise stipulated herein.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements. As used herein, use of the term "nominal" or "nominally" when referring to an amount may include a designated or theoretical amount that may vary from an actual or otherwise measurable amount.

While the principles of the invention have been described herein, it is to be understood by those skilled in the art that this description is made only by way of example and not as a limitation as to the scope of the invention. Other embodiments are contemplated within the scope of the present invention in addition to the embodiments shown and described herein. Modifications and substitutions by one of ordinary skill in the art are considered to be within the scope of the present invention, which is not to be limited except by the following claims.

What is claimed is:

1. An optical communication system comprising:
    first and second cable landing stations coupled to a trunk path in an optical cable;
    at least one hub-node, each of the hub-nodes being coupled to the trunk path through an associated hub-node branching unit;
    at least one mid-node, each of the mid-nodes being coupled to at least one of the hub-nodes through an associated mid-node branching unit and an associated mid-node path in the optical cable, the mid-node path not including the trunk path whereby mid-node signals may be communicated between each of the mid-nodes and the at least one of the hub-nodes coupled thereto without being provided on the trunk path; and
    at least one sub-node, each of the sub-nodes being coupled to at least one of the mid-nodes through an associated sub-node branching unit and an associated sub-node path in the optical cable, the sub-node path not including the trunk or mid-node path, whereby sub-node signals may be communicated between each of the sub-nodes and the at least one of the mid-nodes coupled thereto without being provided on the trunk or mid-node path.

2. The optical communication system of claim 1, wherein each of the sub-nodes is coupled to first and second ones of the mid-nodes through the associated sub-node branching unit, and first and second sub-nodes of the associated sub-node path, and wherein the sub-node branching units directly connect optical fibers to provide the associated sub-node path.

3. The optical communication system of claim 1, wherein each of the sub-nodes is coupled to first and second ones of the mid-nodes through the associated sub-node branching unit and first and second sub-nodes of the associated sub-node paths, and wherein the sub-node branching units comprise an optical add-drop multiplexer to provide the associated sub-node paths.

4. The optical communication system of claim 1, wherein each of the mid-nodes is configured to send and receive aggregate signals on the mid-node path at a first data rate, and to send and receive sub-node signals to and from ones of the sub-nodes coupled thereto at a second data rate lower than the first data rate.

5. The optical communication system of claim 1, wherein each of the mid-nodes is configured to send and receive aggregate signals to and from the mid-node path on a different associated wavelength.

6. The optical communication system of claim 1, wherein at least one of the associated mid-node branching units directly connects optical fibers to provide the associated mid-node path.

7. The optical communication system of claim 1, wherein at least one of the associated mid-node branching units comprises an optical add-drop multiplexer.

8. The optical communication system of claim 1, wherein at least one of the hub-nodes comprises a hub-node transponder configured for sending and receiving aggregate signals to and from the trunk path, and a mid-node transponder configured for sending and receiving mid-node signals to and from the associated mid-node path.

9. The optical communication system of claim 1, wherein at least one of the mid-nodes comprises a mid-node transponder configured for sending and receiving aggregate signals to and from the mid-node path, and a sub-node transponder configured for sending and receiving sub-node signals to and from the associated sub-node path.

10. A optical communication system comprising:
    first and second cable landing stations coupled to a trunk path in an optical cable;

a hub-node coupled to the trunk path through an associated hub-node branching unit for receiving first associated aggregate signals from at least one of the first and second cable landing stations, the first associated aggregate signals comprising associated mid-node data, the hub-node being configured to provide mid-node signals;

a plurality of mid-nodes, each of the mid-nodes being coupled to the hub-node through an associated mid-node branching unit and a mid-node path in the optical cable, whereby each of the mid-nodes is configured for receiving an associated one of the mid-node signals through the mid-node path without the associated ones of the mid-node signals being provided on the trunk path, and at least one of the mid-nodes being configured to provide sub-node signals; and a plurality of sub-nodes, each of the sub-nodes being coupled to at least one mid-node through an associated sub-node branching unit and a sub-node path in the optical cable, whereby each of the sub-nodes is configured for receiving an associated one of the sub-node signals through the sub-node path without the associated ones of the sub-node signals being provided on the trunk or mid-node path.

11. The optical communication system of claim 10, the system further comprising:

a second hub-node coupled to the trunk path through a second associated hub-node branching unit for receiving second associated aggregate signals from at least one of the first and second cable landing stations, the second associated aggregate signals comprising second associated mid-node data, the second hub-node being configured to provide second mid-node signals, wherein a plurality of mid-nodes are coupled to the second hub-node through the associated mid-node branching units and a second mid-node path in the optical cable, whereby each of the mid-nodes is configured for receiving an associated one of the second mid-node signals through the second mid-node path without the associated ones of the second mid-node signals being provided on the trunk path.

12. The optical communication system of claim 11, wherein the first and second hub-nodes are configured to receive the first aggregate signals and the second aggregate signals, respectively, on different associated wavelengths.

13. The optical communication system of claim 10, wherein the hub-node is configured to receive the first aggregate signals at a first data rate and to send associated ones of the mid-node signals on the mid-node path at a second data rate lower than the first data rate.

14. The optical communication system of claim 10, wherein at least one of the mid-node branching units directly connects optical fibers to provide the associated mid-node path.

15. The optical communication system of claim 10, wherein at least one of the associated mid-node branching units comprises an optical add-drop multiplexer.

16. The optical communication system of claim 10, wherein the mid-node comprises a mid-node transponder configured for sending and receiving aggregate signals to and from the mid-node path, and a sub-node transponder configured for sending and receiving the sub-node signals to and from the sub-node path.

17. The optical communication system of claim 10, wherein the hub-node comprises a hub-node transponder configured for sending and receiving aggregate signals to and from the trunk path, and a mid-node transponder configured for sending and receiving the mid-node signals to and from the mid-node path.

18. A method of configuring an optical communication system:

coupling a hub-node to a trunk path in an optical cable, the hub-node being configured for receiving first associated aggregate signals transmitted on the trunk path;

coupling a plurality of mid-nodes to the hub-node, each of the mid-nodes being coupled for receiving associated mid-node signals from the hub-node through an associated mid-node path in the optical cable without the associated mid-node signals being provided on the trunk path; and coupling a plurality of sub-nodes to at least one of the mid-nodes, each of the sub-nodes being coupled for receiving associated sub-node signals from respective mid-nodes through an associated sub-node path in the optical cable without the associated sub-node signals being provided on the trunk path or the mid-node path.

19. The method of claim 18 further comprising:

coupling a second hub-node to the trunk path, the second hub-node being configured for receiving second associated aggregate signals transmitted on the trunk path, each of the plurality of mid-nodes being coupled for receiving associated second mid-node signals from the second hub-node through a second associated mid-node path in the optical cable without the associated second mid-node signals being provided on the trunk path.

20. The method of claim 18, wherein the first and second hub-nodes are configured to receive the first aggregate signals and the second aggregate signals, respectively, on different associated wavelengths.

* * * * *